(12) United States Patent
Liou

(10) Patent No.: US 7,881,728 B2
(45) Date of Patent: Feb. 1, 2011

(54) SELF-POWERED POSITIONING AND MODEM SYSTEM FOR TWO-WAY RADIO

(76) Inventor: Henry Liou, 480 Apollo St., Suite E, Brea, CA (US) 92821

( * ) Notice: Subject to any disclaimer, the term of this patent is extended or adjusted under 35 U.S.C. 154(b) by 0 days.

(21) Appl. No.: 11/165,653

(22) Filed: Jun. 24, 2005

(65) Prior Publication Data

US 2005/0288039 A1    Dec. 29, 2005

Related U.S. Application Data

(60) Provisional application No. 60/582,764, filed on Jun. 25, 2004.

(51) Int. Cl.
*H04W 24/00* (2009.01)
*H04M 11/04* (2006.01)

(52) U.S. Cl. ................... 455/456.1; 455/404.1

(58) Field of Classification Search .............. 455/404.1, 455/404.2, 457, 456.1, 456.2, 456.6; 342/357.1
See application file for complete search history.

(56) References Cited

U.S. PATENT DOCUMENTS

| | | | | |
|---|---|---|---|---|
| 5,726,893 A | * | 3/1998 | Schuchman et al. | 455/456.3 |
| 5,884,199 A | | 3/1999 | Maki | |
| 6,795,698 B1 | * | 9/2004 | Kumor | 455/404.1 |
| 2004/0121756 A1 | * | 6/2004 | Griffin et al. | 455/404.2 |
| 2004/0164894 A1 | * | 8/2004 | Liou | 342/357.1 |
| 2004/0176106 A1 | * | 9/2004 | Tendler | 455/456.5 |

FOREIGN PATENT DOCUMENTS

JP      3130461      5/1937

OTHER PUBLICATIONS

Bob Bruninga, APRS Mic-Lite APRL and TAPR Digital Communications Conference 18th, 13 pages, Phoenix, Sep. 24-26, 1999.

* cited by examiner

*Primary Examiner*—George Eng
*Assistant Examiner*—Michael Faragalla
(74) *Attorney, Agent, or Firm*—Raymond Y. Chan; David and Raymond Patent Firm

(57) ABSTRACT

A self-powered positioning and modem system, which is adapted for linking to a radio frequency transmitter of a communication device to communicating with a communication system through radio frequency signals, includes a GPS controller for communicatively linking to the radio frequency transmitter. The GPS controller includes a position information receptor receiving a positioning data, a signal converter linked to the position information receptor to encode the positioning data into a RF positioning signal in form of audio signal, wherein the GPS controller is triggered for wirelessly transmitting the RF positioning signal through the radio frequency transmitter to the communication system.

2 Claims, 8 Drawing Sheets

SELF-POWERED POSITIONING AND MODEM SYSTEM FOR TWO-WAY RADIO

CROSS REFERENCE OF RELATED APPLICATION

This application is a non-provisional application of a provisional application, having an application No. 60/582,764 and a filing date of Jun. 25, 2004.

BACKGROUND OF THE PRESENT INVENTION

1. Field of Invention

The present invention relates to a communication device, and more particularly to self-powered positioning and modem system for radio/audio communication device, wherein the positioning and modem system is capable of independently sending out positioning data in the form of an audio signal to a control center such that the positioning and modem system supports both the communication provision and the position location provision.

2. Description of Related Arts

Communication devices, such as cellular phone, satellites phone and "Pocket PC", are considered as one of the common communication tools, wherein a user is able to wirelessly communicate with another user via the communication device via a public network. A communication device generally comprises a microphone speaker and a modem connected with the microphone speaker in such a manner that when the microphone speaker receives an audio signal, the audio signal is encoded to a digital data and sent out in a wireless manner.

Generally speaking, a two-way radio system is considered as one of the most common low-end communication devices, wherein the two-way radio communication system comprises a remote user sending and receiving voice communications to a user at a base station location along a pre-established communications channel. Those communications are half-duplex in nature whereby a user asserts a Push-To-Talk (PTT) switch associated with the radio to transmit a message, otherwise the radio is in receive mode listening for messages when the switch is not asserted. In many scenarios, a detachable corded hand-held microphone unit is used with the radio which the user primarily uses to send and receive voice communications via the radio. The microphone has its own PTT switch which controls the radio transmit/receive mode.

The interface between the radio and the handheld microphone in this scenario typically comprises a PTT signal from microphone unit to radio unit, a mic-audio from microphone unit to radio unit, a speaker audio from radio unit to microphone unit, a round return from microphone unit to radio unit, and a DC Offset voltage from radio unit to microphone unit.

With PTT asserted, the mic-audio signal from the microphone is passed as a baseband signal to the radio which performs conditioning, modulation, and RF signal transmission to complete the transmit steps. With PTT de-asserted, the radio serves to receive the RF signal transmission, demodulate and condition, and then send the baseband signal as speaker audio to the microphone.

Nowadays, the communication devices are incorporated with a Global Positioning System (GPS) for tracking the location of the user, wherein the common GPS generally comprises a built-in GPS receiver equipped with the modem to wirelessly send out a positioning data from the communication device. In order to receive the GPS positioning data, the communication device must employ a processor unit arranged in such a manner that after the processor unit receives the positioning data, the positioning data is decoded to a readable data so that the user is able to locate the position of the sender.

However, such GPS incorporated with the communication device has several drawbacks. The communication device can only transmit both the audio signal and the positioning data wirelessly through the employment of a modem, which may fail should the communication system experiences any technical or power problem.

In addition, existing lower-end radio systems do not support position location provisions, although providing a remote user's position to a base station would be very desirable to enable tracking of the remote user, particularly through the use of the Global Positioning Satellite (GPS) system. Therefore, the GPS must be independently installed to provide positioning data.

For example, while patrolling, police officers or security officers generally must be armed with a radio frequency communication device to keep contact with the control center. For safety and arrangement purpose, their locations are preferred to be tracked by the control center so that the control center can give assistance to them in case of emergency. However, the police officers or the security officers must carry an additional GPS device in order to send out the positioning signal to the control center. In other words, the additional GPS device will increase the load of the police officers or the security officers while patrolling.

As a result, there exists some communication systems with GPS microphone incorporated, wherein the GPS microphone is capable of sending out positioning data to a control center. However, such GPS microphone must be integrated with the communication system such that the configuration of the communication system must be altered to incorporate with such GPS microphone. Therefore, such GPS microphone incorporated communication systems may not be able to provide maximum safety for police or security officers, and as a result, a better positioning system for communication systems must be designed.

SUMMARY OF THE PRESENT INVENTION

A main object of the present invention is to provide a self-powered positioning and modem system for a radio/audio communication device, wherein the self-powered positioning and modem system is capable of sending out positioning data in the form of an audio signal to a control center such that the self-powered positioning and modem system supports both the communication provision and the position location provision.

Another object of the present invention is to provide a self-powered positioning and modem system for a radio/audio communication device, wherein the positioning data is capable of being transmitted through a radio frequency so as to provide an instant positioning location to the radio/audio communication device in a wireless communication manner.

Another object of the present invention is to provide a self-powered positioning and modem system for a radio/audio communication device, wherein the positioning data is also capable of being transmitted through a modem in a wireless communication manner, such that a positioning data is continuously sent out, even when the radio/audio communication device is not activated, providing a user with maximum safety.

Another object of the present invention is to provide a self-powered positioning and modem system for a radio/audio communication device, wherein the self-powered positioning and modem system is self-powered that the self-powered positioning and modem system automatically sends out positioning data wirelessly, so as to provide a user with maximum safety.

Another object of the present invention is to provide a self-powered positioning and modem system for a radio/audio communication device, wherein the self-powered positioning and modem system periodically sends out positioning data at a predetermined time interval, so as to provide a clear and accurate location of the officer, providing the officer with greater protection.

Another object of the present invention is to provide a self-powered positioning and modem system for a radio/audio communication device, wherein the positioning data is transmitted through a radio frequency so as to provide an instant positioning location to the radio/audio communication device in a wireless communication manner.

Another object of the present invention is to provide a self-powered positioning and modem system for a radio/audio communication device, wherein the communications channel can be any of any nature, such as PTT type microphone having a PTT switch as mentioned above switching the microphone from a message transmitter to a message receiver. The communications channel can be a hands-free receiving and transmitting device, wherein such hands-free device has an ear phone connected to a microphone such that the user can listen to message transmitted from the center through the ear phone and talking to the center through the microphone, without the need to press any keys or hold the microphone when talking to the control center. The communications channel can also be a two piece communications device comprises an ear phone and a throat microphone piece adapted for attaching to the throat of a user, such that a message spoken by the user can be better picked up by the microphone and received by the control center.

Another object of the present invention is to provide a self-powered positioning and modem system for a radio/audio communication device, wherein a conventional microphone can be upgraded to form the self-powered positioning and modem system without modifying the original radio frequency transmitting system of the conventional microphone and the radio/audio communication device, so as to minimize the manufacturing cost of the radio/audio communication device incorporating with the self-powered positioning and modem system. In other words, the present invention enables existing lower-end two-way radio systems to be upgradeable to support acquiring and providing user position data without modification to either the radio itself or the radio communication infrastructure. No modification is required incorporate with the low-cost detachable microphone units. Typical microphone housing has ample space to support insertion of this enhancement product.

Another object of the present invention is to provide a Self-powered positioning and modem system for a radio/audio communication device, which successfully provides an economic and efficient solution for transmitting the positioning data from the self-powered positioning and modem system to the radio/audio communication device through the radio frequency.

The concept of the present invention is to basically sever the radio-to-microphone interface signals within the microphone housing, and insert the present invention in place which consists of four basic components: GPS antenna and receiver unit; a controller unit; a data packet modem; and a baseband processing unit. Basically, packet modem data is mixed with the baseband signal to enable control messages and data messages to be transmitted using the existing radio voice channel open between the remote user and base station.

It is also an objective of the present invention to provide a methodology for controlling the acquisition, transmission, and processing of user GPS information within such a system set-up.

The novelty of the present invention is in how they are integrated together and with the rest of the radio equipment, and how they implement a methodology to provide such position reporting within such a system. The GPS antenna and receiver unit provide GPS location information from the external GPS satellites to the controller unit which serves as the "brains" for the present invention. The controller also monitors user PTT signals and sends processed PTT signals to the radio. The controller also has a host computer interface which is only used when the present invention is used in a base-station configuration. In such instances, the host computer initiates polling requests or configuration change messages to a remote unit. The controller also interfaces with a half-duplex data packet modem to which it sends along a digital GPS data message (if remote user) or a control message (if base station user) that is desired to be transmitted. Conversely, the controller can read digital data from the modem which corresponds either to a received GPS data message (if base station user) or a received control message (if remote user). The packet modem also interfaces with the baseband processor. The baseband processor basically processes the mic- and the speaker audio signals to and from the radio, and mixes and extracts the packet modem signals.

The premise of the methodology that is part of this invention is that the remote unit would autonomously acquire and maintain position information via GPS, and conditionally include this information within a voice transmission based on a last reported time criteria. The base station would only send a control message to the remote unit if it wanted to poll the unit, implying the remote would send a position message alone without voice communications if need be, as soon as possible over the current voice channel. The other case is if the base station wishes to change the current behavior of that remote unit such as increasing position reporting frequency. It is worth to mention that the present invention can be configured to send reports whenever the PTT is depressed with a certain minimum time in between reports, at a specific interval of time, or whenever the user has moved a certain distance away from the last reported location.

Accordingly, in order to accomplish the above objects, the present invention provides a self-powered positioning and modem system for a radio/audio communication device, comprising:

a radio/audio communication device comprising an audio accessory, such as a speaker-microphone set, a remote speaker microphone or headset, a radio frequency transmitter and a communication system communicatively networked with the radio frequency transmitter through radio frequency signals; and a self-powered positioning and modem system electrically connected with the radio frequency transmitter, wherein the positioning and modem system comprises a GPS controller to encode a positioning data into a RF positioning signal in a form of audio signal wherein when the GPS controller is triggered, the radio frequency transmitter is activated to transmit RF positioning signal to the radio/audio communication device, a modem for wirelessly transmitting the positioning data to the communication system and a power source in electrical connection with the GPS controller and the modem, so as to supply a power required by the GPS controller and the positioning and modem system.

In addition, the present invention further provides a process of transmitting a positioning data to a communication system from a self-powered positioning and modem system for a radio/audio communication device which comprises a radio/audio communication device comprising a speaker-microphone set and a radio frequency transmitter, and a self-powered positioning and modem system comprises a GPS controller, a modem and a power source, comprising the steps of:

(a) electrically connecting the power source, the GPS controller and the modem of the positioning modem device;

(b) communicatively networking the radio frequency transmitter to the radio/audio communication device through radio frequency signals;

(c) activating the GPS controller to encode the positioning data into a RF positioning signal in a form of audio signal;

(d) activating the modem to wirelessly transmit the positioning data signal to the communication system; and (e) activating the radio frequency transmitter to transmit the RF positioning signal to the radio/audio communication device for transmitting the RF positioning signal to the communication system.

These and other objectives, features, and advantages of the present invention will become apparent from the following detailed description, the accompanying drawings, and the appended claims.

DETAILED DESCRIPTION OF THE PREFERRED EMBODIMENT

Figure 2:
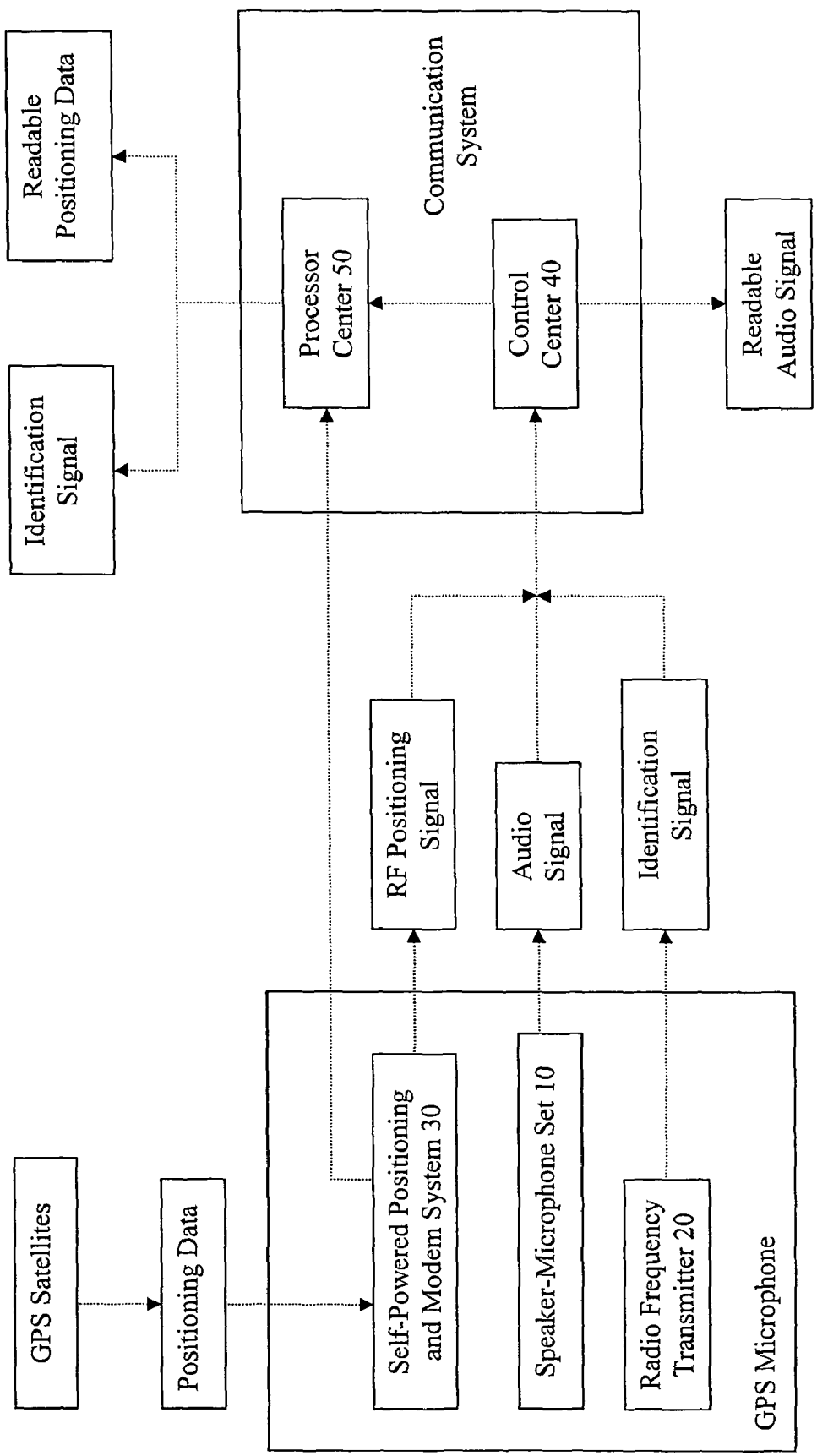
FIG. 2 is a flow chart for transmitting a positioning data from the self-powered positioning and modem system for the radio/audio communication device according to the preferred embodiment of the present invention.
Figure 3:
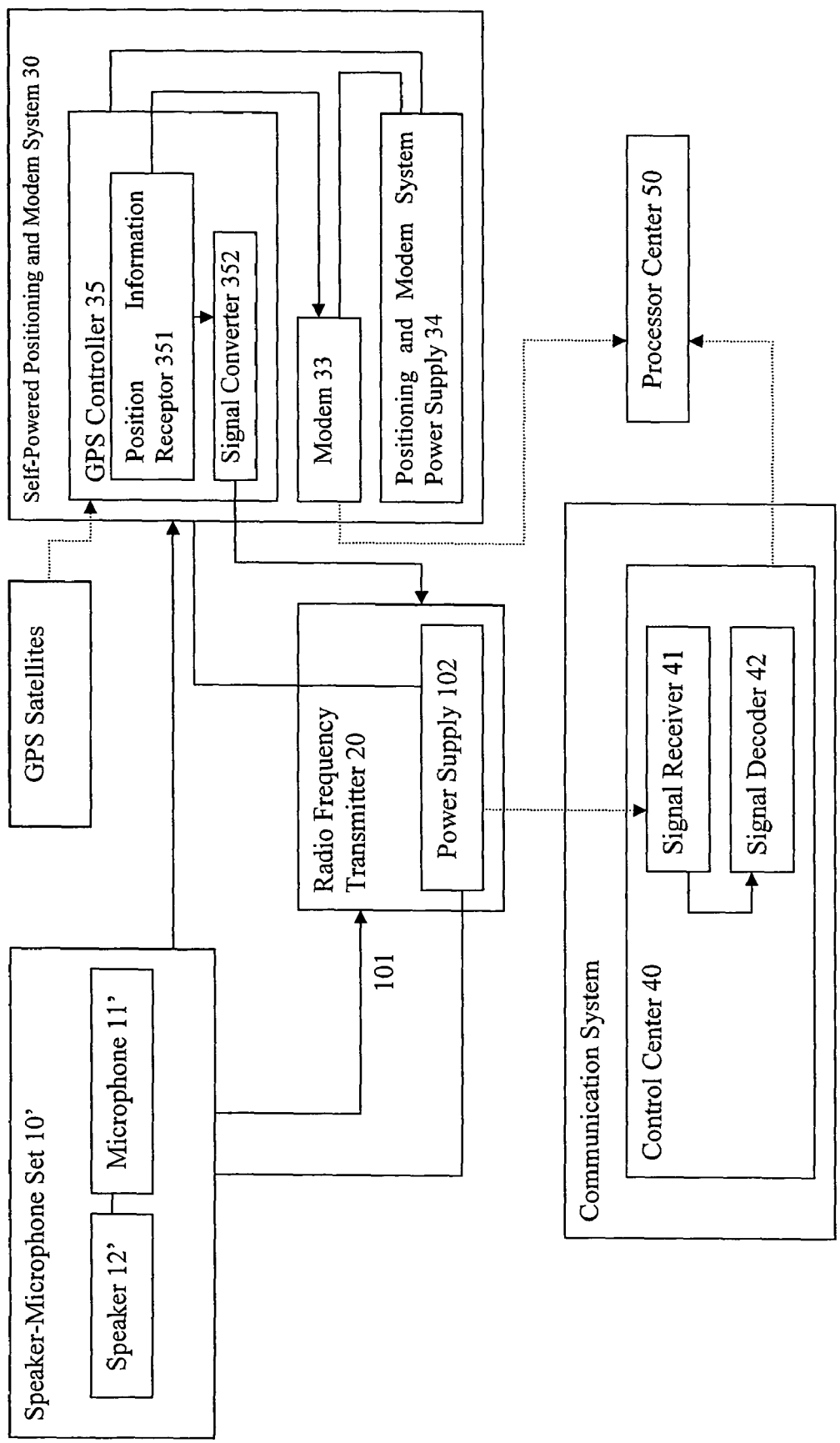
FIG. 3 illustrates an alternative mode of the radio/audio communication device according to the above preferred embodiment of the present invention.
Figure 4:
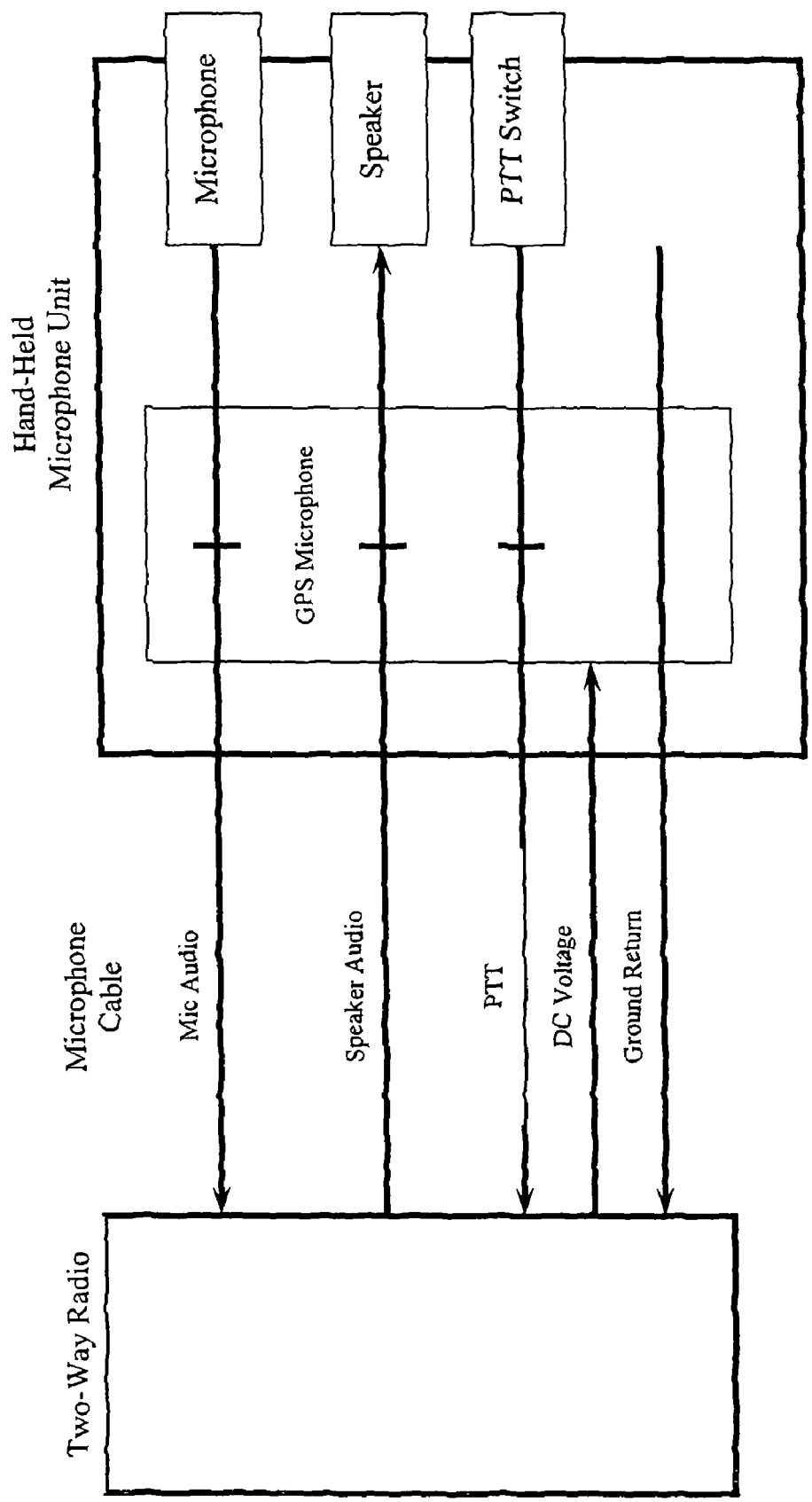
FIG. 4 is a signal diagram of the existing radio-to-handheld microphone interface, illustrating the self-powered positioning and modem system being incorporated therewith.

Referring to FIGS. 1 through 7 of the drawings, a self-powered positioning and modem system for a radio/audio communication device according to a preferred embodiment of the present invention is illustrated, wherein the positioning and modem system of the present invention is capable of incorporating with a radio and a microphone, and the interface signals that are impacted, as shown in FIG. 4.

The self-powered positioning and modem system comprises a radio/audio communication device comprising an audio accessory such as a speaker-microphone set 10, a radio frequency transmitter 20 communicatively networked with a communication system through radio frequency signals, and a positioning and modem system 30 electrically connected to the radio frequency transmitter 20 and the speaker-microphone set 10 of the audio accessory.

The positioning and modem system 30 comprises a modem 33, a positioning and modem system power supply 34 and a GPS controller 35. The GPS controller 35 comprises a position information receptor 351 provided for receiving a positioning data from a GPS satellite periodically. The receiving time period between each positioning datum received by the positioning information receptor 351 is predetermined by the users, according to the necessity.

When the GPS controller is triggered by the speaker-microphone set 10, the positioning data received by the position information receptor 351 is transmitted to the signal converter 352. Accordingly, the audio accessory is embodied as a two-way radio device such as the speaker-microphone set 10, a remote speaker microphone, a headset, a throat microphone or other audio accessories incorporating with the radio frequency transmitter 20.

After the positioning data is transmitted to the signal converter 352, the signal converter 352 encodes the positioning data into a RF positioning signal in the form of audio signal. The radio frequency transmitter 20 is then activated to transmit RF positioning signal to the communication device system.

The positioning data received periodically by the position information receptor 351 is also transmitted to the modem 33 of the positioning and modem system 30. The positioning data is then wirelessly transmitted to the processor center 50 so as to provide the communication system with the exact position of the radio/audio communication device periodically, even when the GPS controller 35 is not triggered by the speaker-microphone set 10 of the audio accessory. The transmitting time period between each transmission of positioning data by the modem 33 is predetermined by the users, according to the necessity.

On top of the modem 33 acting as a backup for the transmission of positioning data to the communication system, the positioning and modem system power supply 34 provides sufficient power required by the positioning and modem system 30, so as to allow the positioning and modem system 30 to independently function, without having to rely on the power supply 102 of the radio frequency transmitter 20, such that the position of the user can be determined at any given time, not only when the speaker 12 of the speaker-microphone set 10 is triggered, such that the safety of the user can be enhanced. Accordingly, the power supply 34 comprises an internal rechargeable battery for power.

The speaker-microphone set 10 has a variety of embodiments, essentially comprises a microphone 11 and a speaker 12 electrically connected to the microphone 11 in such a manner that the microphone is capable of receiving and encoding a voice message into an audio signal and the speaker 12 is capable of broadcasting a received audio signal from the radio frequency transmitter 20.

In order to incorporate the positioning and modem system 30 with a conventional radio/audio communication device used nowadays by law enforcement bodies, such speaker-microphone set 10 is a conventional push-to-talk (PTT) wireless radio/audio communication device, which is a two-way radio system, wherein when the PTT circuitry is triggered, the microphone 11 is ready to receive the audio signal in such a manner that the radio frequency transmitter 20 is adapted to transmit the audio signal to the radio/audio communication device.

In an alternative embodiment, as illustrated in FIG. 3, the speaker-microphone set 10' is a hands-free receiving and transmitting device, comprises an ear phone 12' adapted for attaching to an ear of a user and a microphone 11' electrically connected to and extending from the ear phone 12' in such a manner that when the ear phone 12' is in place of the ear of the user, the microphone 11' is positioned next to the mouth of the user, allowing the user to speak to and listen from the speaker-microphone set 10 without the need to hold on the speaker-microphone set 10' and providing maximum flexibility to the user. Also, the user can listen and talk to the control center 50 at the same time, unlike conventional PTT type microphone, requiring a user to manually trigger PTT switch in order to switch from receive mode for listening messages to transmit a message.

The radio frequency transmitter 20 is a radio frequency transmitting device adapted to send and receive the radio frequency, wherein the radio frequency transmitter 20 functions as a wireless communication link between the positioning and modem system 30, the speaker-microphone set 10 and the communication system.

Accordingly, when the communication device is a two-way radio system, the radio frequency transmitter 20 transmits the audio signal encoded by the microphone 11 of the speaker-microphone set 10 and the RF positioning signal encoded by the signal converter 352 to the signal receiver 41 of the control center 40 of the communication system.

The radio frequency transmitter 20 can be automatically or manually tuned to communicate with another radio/audio communication device by matching the same radio frequency. In other words, more than one self-powered positioning and modem system can be set to use the same radio frequency by the manufacturer or security service company.

Alternatively, the user is also able to manually tune the radio frequency transmitter 20 to communicatively network with another desirable radio/audio communication device or automatically tune the radio frequency transmitter 20 to search another radio/audio communication device that is positioned within the coverage area with respect to radio/audio communication device.

The GPS controller 35 is arranged for managing how and when position data is processed and passed along to another component. It monitors stimulus conditions such as the Push-To-Talk (PTT) activation and does all the time keeping and decision making. Because of limited required processing throughput, the cited example with the present invention is a basic 8-bit micro-controller.

Alternative to this range is from custom sequential/combinational logic implementations of a basic controller to specialized devices such as PICs (Peripheral Interface Controller), high-end RISC and CISC architecture-based microprocessors.

The GPS controller 35 comprises receiving means 351 for receiving the positioning data from an external position transponder system, such as an external GPS satellite, and a signal converter 32 arranged to convert the positioning data into the RF positioning signal, wherein the RF positioning signal is transmitted to the radio/audio communication device through the radio frequency transmitter 20.

The receiving means 351 according to the preferred embodiment is a position information receptor, such as a GPS antenna, adapted for wirelessly communicating with the GPS satellites so as to receive a GPS position data as the positioning date therefrom. The receiving means 351 performs physical interface layer processing, correlates the data, and provides it through a component interface with a particular format and protocol. Accordingly, the position information receptor of the receiving means 351 receives a position signal or signals from an external position transponder system, performs physical interface layer processing, correlates the data, and provides it through a component interface with a particular format and protocol.

The cited example with the GPS controller 35 assumes NMEA-0183 message formats. However, alternative GPS message formats, such as Trimble's proprietary TSIP format, would also apply. Also, alternative positioning systems from GPS, such as IMU, are also supported by the architecture.

The GPS controller 35 further comprises a data packet modem such as a half-duplex data modem (full-duplex not being needed for two-way radio) which when transmitting position information from the position information receptor of the receiving means 351, takes positioning data and implements a modulation scheme to impose position information onto an output baseband audio signal via the signal converter 352.

When receiving position information, the component demodulates and extracts the position data from the input baseband audio signal. Aside from position information, the data packet modem also conveys control and configuration messages. In this mode, this data packet modem also serves to fortify the position information so as to maintain its integrity through over-the-air transmission. In the cited example, an FFSK/MSK data modem supporting a 2400 bps data rate was used based on cost, reliability, and performance trade-offs. A data modem with alternative modulation schemes may be used and alternative data rates may be employed. Data rates much lower than 2400 bps are probably not practical in this application because of a perceived annoyance factor of in-band tones lasting much more than about 300 ms. The cited example supports FEC, CRC, and interleaving options for data integrity.

According to the preferred embodiment, the GPS controller 35 further comprises a baseband signal processor which serves to mix the microphone input baseband signal with the data modem signal and passes it to the radio for transmission. For receive operation, the baseband signal processor takes the receiving audio baseband signal from the radio and delivers it to the local speaker and to the data modem for processing. The baseband signal processor can also perform voice filtering with options such as de- and pre-emphasis, and voice gain control although these are not germane to position information processing.

The radio/audio communication device further comprises a portable case 301 for receiving the GPS controller 35, the modem 33 and the power supply 34. In other words, the GPS controller 35 is received in the portable case 10 such that the user is able to carry the GPS controller 35 to communicatively link to the audio accessory.

Accordingly, the modem device power supply 34 comprises a rechargeable battery disposed in the portable case 301 electrically connected to speaker-microphone set 10 to supply electricity and the modem device portable case 301 electrically connected to the GPS controller 35 to supply electricity respectively. It is worth to mention that the self-powered positioning and modem system of the present invention is embodied as an external device to communicatively connect to any existing radio/audio communication device such that the RF positioning signal is adapted to transmit through the radio frequency transmitter 20 of the existing radio/audio communication device. Therefore, the existing radio/audio communication device does not need to be modified its original configuration in order to incorporate with the self-powered positioning and modem system of the present invention.

Figure 5:
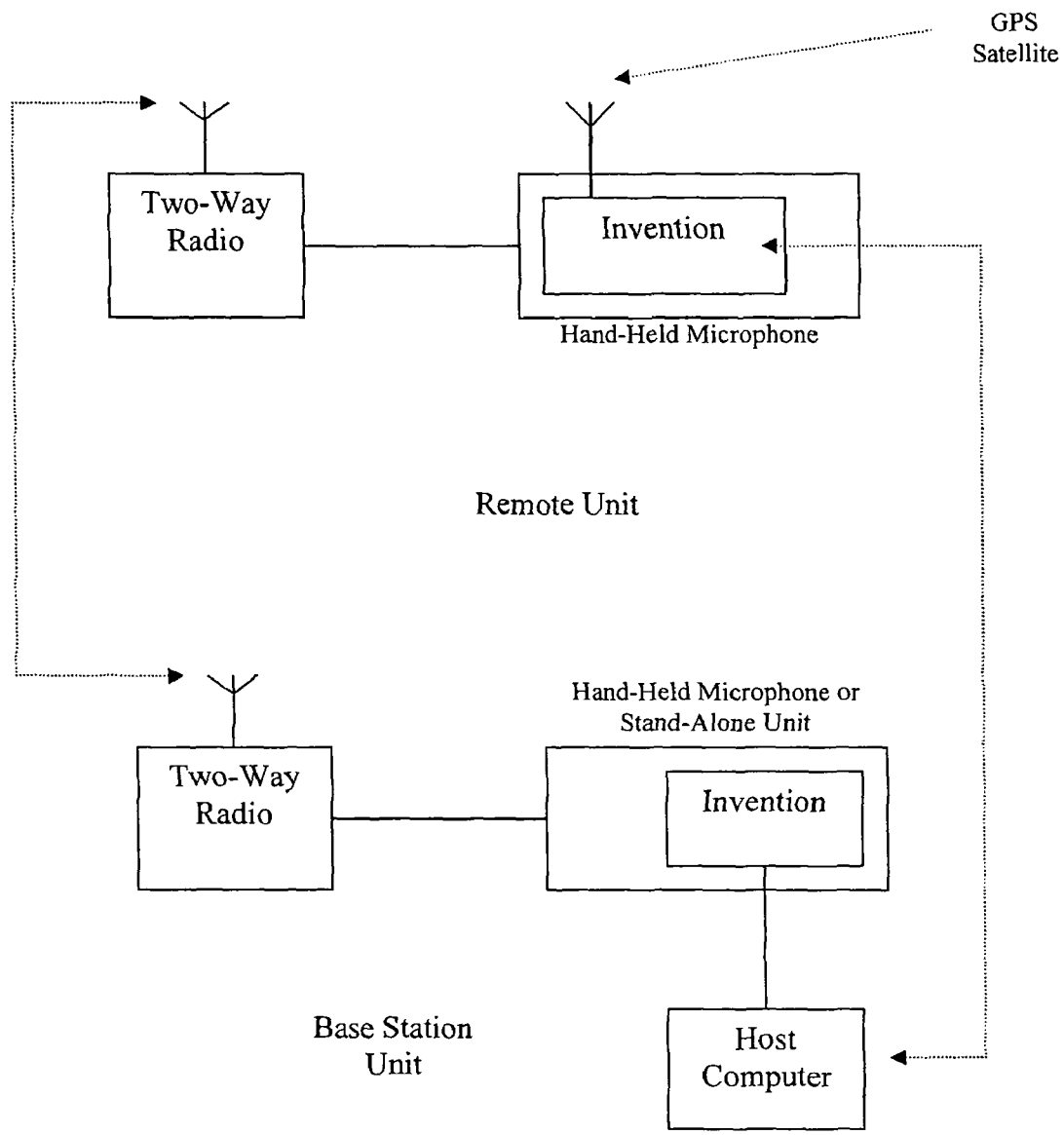
FIG. 5 is a block diagram showing the self-powered positioning and modem system of the present invention employed in a typical two-way radio system.

FIG. 5 illustrates the self-powered positioning and modem system of the present invention employed in a typical two-way radio system. On the remote unit side of the self-powered positioning and modem system, GPS satellite information is received via a GPS antenna of the receiving means 351 that is part of the product residing within the hand-held microphone unit of the speaker-microphone set 10. This information is conveyed to the remote unit two-way radio which transmits it via the radio's RF antenna of the radio frequency transmitter 20.

On the base station side of the radio/audio communication device, the RF antenna on the two-way radio receives the communique and the radio puts out a baseband signal on the speaker out signal which goes out to another hand-held microphone containing the product. However, note that the product need not be housed in the microphone chassis of the base station unit, and may be more suitable housed in a stand-alone package since that co-location is no longer critical in a base station set-up.

Furthermore, it should also be noted that for the base station, the GPS antenna and receiver unit is not used and may be eliminated, and note that a host computer interface exists. The host computer in the radio/audio communication device collects the GPS position data output by the controller within the product and can display and back-end process this data as so desired. The host computer is also used to send control messages to the product on the base station side.

The controller interprets the message, commands the packet modem and the baseband processor to mix and send the message which is put out as a baseband signal on the mic-audio line to the base station two-way radio. The base station radio transmits to the remote unit via RF. The remote unit two-way radio passes a baseband signal on the speaker out line to the hand-held microphone containing the product. The product extracts the message with the baseband processor and packet modem and passes it to the controller. The controller then interprets the message and acts accordingly.

The GPS satellite information is also conveyed host computer of the base station unit by means of the modem inside the self-powered positioning and modem system, so that the GPS satellite information can be received both ways, such that even when the remote unit two-way radio or the base station unit two-way radio fails, the information can still be received.

Figure 6:
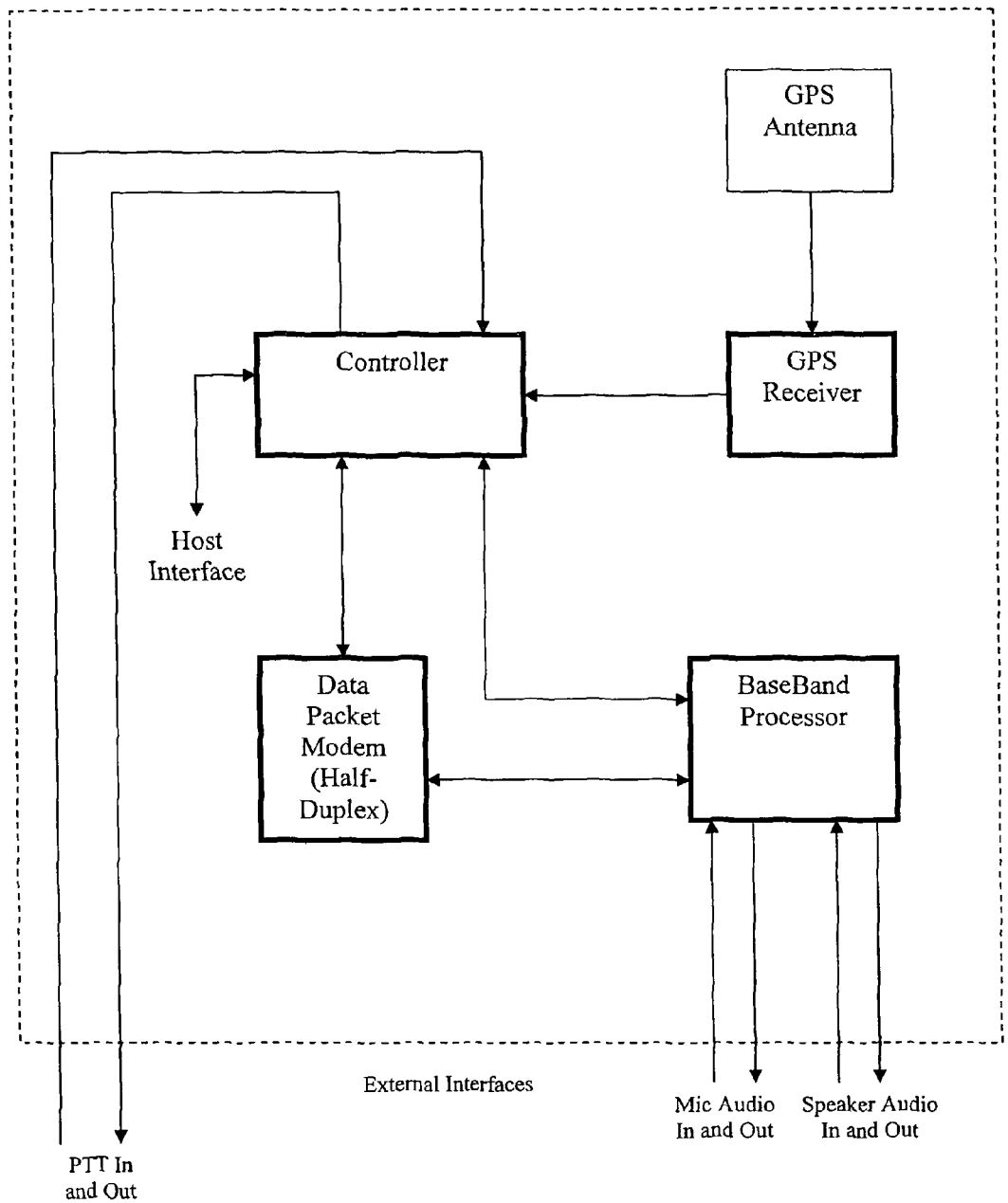
FIG. 6 is a block diagram showing the components of the self-powered positioning and modem system and their interaction according to the above preferred embodiment of the present invention.
Figure 7:
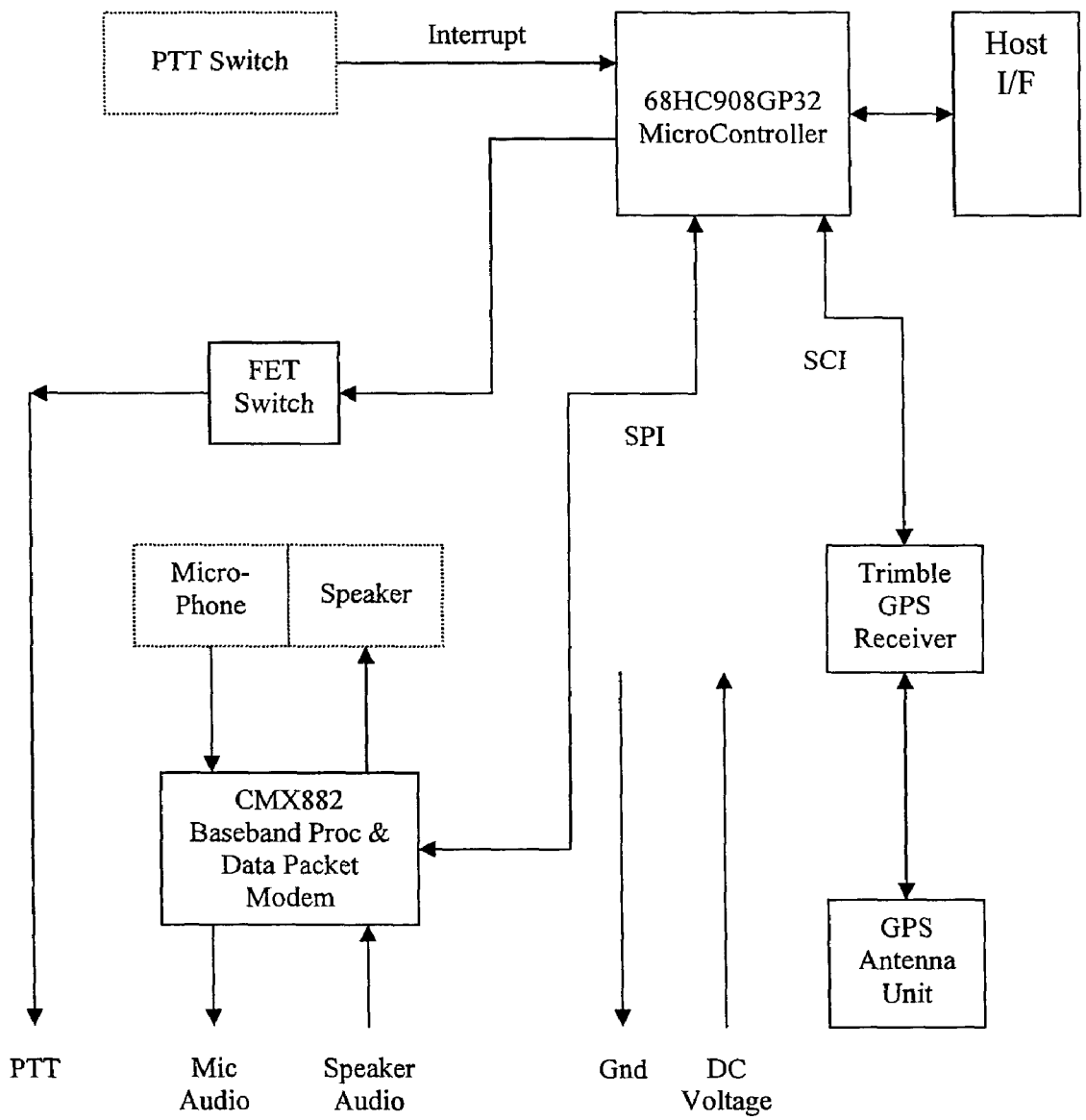
FIG. 7 illustrates the relationship of the components of the self-powered positioning and modem system according to the above preferred embodiment of the present invention.

FIG. 6 illustrates the internal components of the self-powered positioning and modem system of the present invention and how they interface with one another. The figure also shows the external interface. Note that the interface signals are in all grouped as In/Out pairs. This is because the existing radio to hand-held microphone interface signals is severed to accommodate the self-powered positioning and modem system of the present invention as shown in FIG. 4.

As shown in FIG. 2, the present invention further provides a process of transmitting a positioning data to a communication system from a self-powered positioning and modem system for a radio/audio communication device which comprises a radio/audio communication device comprising a speaker-microphone set 10 and a radio frequency transmitter 20, and a self-powered positioning and modem system 30 comprises a GPS controller 35, a modem 33 and a positioning and modem system power supply 34, wherein the process comprises the following steps.

(1) Electrically connect the power supply 34, the GPS controller 35 and the modem 33 of the positioning and modem system 30.

(2) Communicatively network the radio frequency transmitter 20 to the radio/audio communication device through radio frequency signals.

(3) Activate the GPS controller 35 to encode the positioning date into the RF positioning signal in form of audio signal.

(4) Activate the modem 33 to wirelessly transmit the positioning data signal to the communication system.

(5) Activate the radio frequency transmitter 20 to transmit the RF positioning signal to the radio/audio communication device for transmitting the RF positioning signal to the communication system.

In step (1), the power supply 34 is electrically connected to the GPS controller 35 and the modem 33 of the positioning and modem system 30, such that a complete circuit if formed for the positioning and modem system 30, such that the power required by the positioning and modem system 30 is provided by the power supply 34. In doing so, the positioning and modem system 30 is capable of functioning independently, and more specifically, even when the radio/audio communication device fails.

In step (2), the radio/audio communication device should provide a coverage area wherein when the radio frequency transmitter 20 is located within the coverage area, the self-powered positioning and modem system is capable of communicatively networking with the radio/audio communication device.

Once the communication connection is established, the radio transmitter 20 is not only capable of sending out the audio signal from the speaker-microphone set 10 but also transmitting the RF positioning signal from the GPS controller 35. In addition, the radio/audio communication device should send a GPS acquisition configuration command to the positioning and modem system 30 through the radio frequency signals.

In step (3), the GPS controller 35 is activated when the speaker-microphone set 10 is in use wherein the audio signal from the speaker-microphone set 10 is combined with the RF positioning signal from the GSP controller 30 to form an information signal so as to transmit to the radio/audio communication device through the radio frequency transmitter 20.

In other words, once the user uses the speaker-microphone set 10 to communicate with the radio/audio communication device, the GPS controller 35 is automatically activated to receive the positioning data and to encode the positioning data into the RF positioning signal so as to send out the information signal having the RF positioning signal and the audio signal via the radio frequency transmitter 20. In addition, the radio/audio communication device preferably records the information signal from the positioning and modem system 30 as a positioning location history for safety purposes.

Accordingly, the radio frequency transmitter 20 further generates an identification signal, which is in the form of audio signal, with respect to the speaker-microphone set 10 wherein when the RF positioning signal is transmitted from the radio frequency transmitter 20, the identification signal is combined with the R-F positioning signal to transmit to the radio/audio communication device.

The main purpose of the identification signal is to identify the respective positioning and modem system 30 when more than one positioning and modem system 30 is used at the same time. In other words, the radio frequency transmitter 20 is arranged to transmit the information signal which comprises the audio signal, the RF positioning signal, and the identification signal to the radio/audio communication device.

Also, the GPS controller 35 is preset to be activated for receiving the positioning data for a predetermined period of time in step (3). For example, the user is able to preset the GPS controller 35 to receive the positioning data for every ten minutes in such a manner that once the GPS controller 35 encodes the RF positioning signal, the radio frequency transmitter 20 is ready to transmit the RF positioning signal to the radio/audio communication device even there is no audio signal received from the speaker-microphone set 10.

In step (4), the modem 33 wirelessly transmits the positioning data signal to the communication system, such that the positioning data signal is transmitted to the communication directly, without going through the radio/audio communication device, such that even when the radio frequency transmitter 20 is not activated to transmit the RF positioning signal communication system, the communication system can still receive positioning data signal.

In addition, the GPS controller 35 is activated when a request is sent from the radio/audio communication device. Accordingly, the request is a RF signal sent from the radio/audio communication device and is received by the radio frequency transmitter 20 wherein the request is arranged to automatically activate the GPS controller 35 receive the positioning data so as to transmit the RF positioning signal to the radio/audio communication device as a feedback. It is important that when the user is unable to activate the GPS controller 35, the radio/audio communication device is capable of remotely controlling the activation of the GPS controller 35 to track the positioning location of the user. Furthermore, the GPS controller 35 can be manually activated by the user by simply switching on the GPS controller 35, such as pressing an activation button of the GPS controller 35. It is worth to mention the RF positioning signal will send out through the radio frequency transmitter 20 automatically and periodically that the user is able to preset the transmitting time interval of the GPS controller 35. Alternatively, the GSP controller 35 will be triggered by a moving distance of the user that when the user moves more than a preset distance from a last reported location, the RF positioning signal will send out through the radio frequency transmitter 20. In addition, the RF positioning signal will send out through the radio frequency transmitter 20 when the PTT key of the audio accessory is triggered.

The radio/audio communication device, according to the preferred embodiment, comprises a control center 40 which comprises means 41 for receiving the information signal from the positioning and modem system 30 and means 42 for decoding the information signal from the receiving means 41, and a processor center 50 converting the RF positioning signal back to the positioning data. The receiving means 41 is a signal receiver to communicatively network with the positioning and modem system 30 through the radio frequency signals.

The positioning data signal transmitted to the communication system through the modem 33 is received directly by the processor center 50.

The decoding means 42 is a signal decoder adapted for decoding the information signal received by the receiving means 41. Accordingly, when the information signal, which is combined with the audio signal, the RF positioning signal, with the identification signal, is received by the receiving means 41, the decoding means 42 is arranged to decode the audio signal to a readable audio data while the RF positioning signal and the identification signal are then transmitted to the processor center 50.

Accordingly, the processor center 50 is arranged to convert the RF positioning signal into a readable positioning data in such a manner that the radio/audio communication device is adapted to identify the respective positioning and modem system 30 through the identification signal and locate the position of the positioning and modem system 30 according to the readable positioning data.

Figure 1:
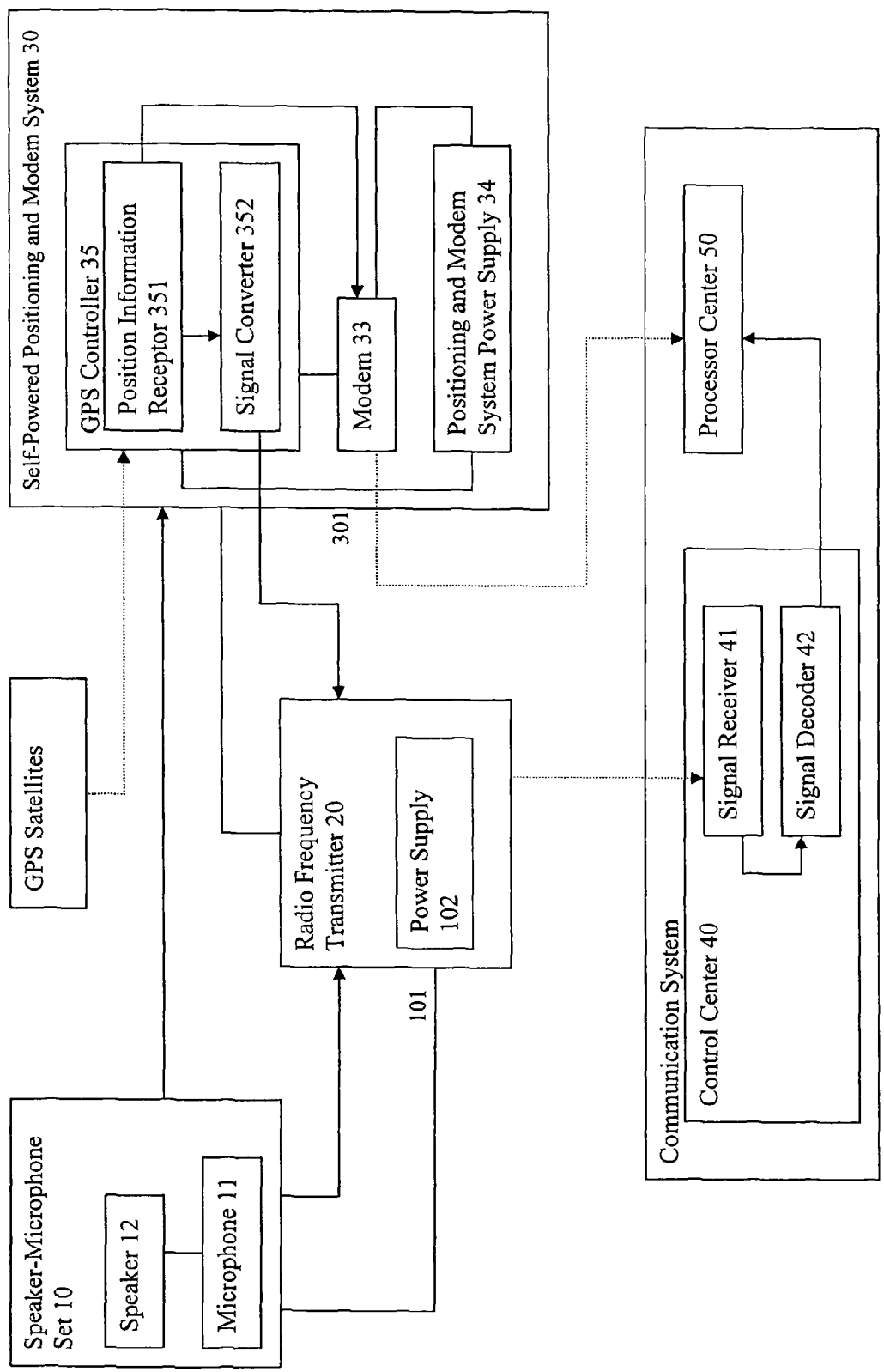
FIG. 1 is a block diagram of a self-powered positioning and modem system for a radio/audio communication device according to a preferred embodiment of the present invention.

FIG. 1 illustrates an example of a use of the self-powered positioning and modem system 30. For example, while patrolling, the police officer should carry the positioning and modem system 30 wherein the radio/audio communication device is installed into the vehicle. Once the communication network is established between the radio frequency transmitter 20 and the radio/audio communication device, the positioning and modem system 30 is capable of transmitting the RF positioning signal to the radio/audio communication device through the radio frequency transmitter 20. Hence, another police officer in the vehicle is able to keep track the location of the police officer carrying the positioning and modem system.

FIG. 3 illustrates another example of the self-powered positioning and modem system, wherein the control center 40 is installed into the vehicle while the processor center 50 is located at the police station in such a manner that the police office carrying the self-powered positioning and modem system is able to communicate with the police office in the vehicle as a conventional two-way radio system while the positioning data is transmitted from the GSP microphone to the processor center 50 through the control center 40. In other words, the control center 40 functions as a communication center to the self-powered positioning and modem system 30 wherein the control center is capable of communicatively networking with the processor center 50 to transmit the positioning data for a long coverage distance.

Figure 8:
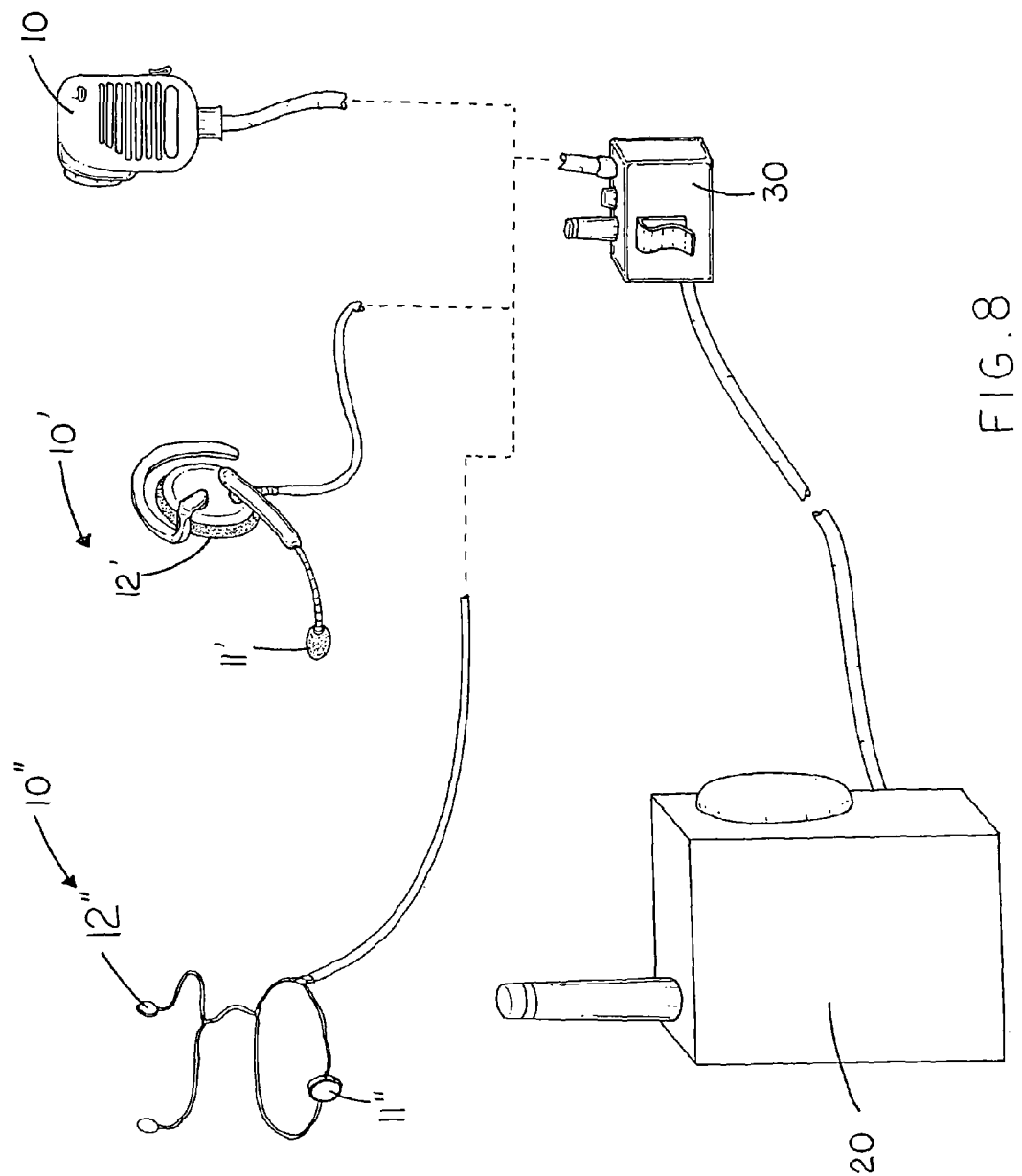
FIG. 8 illustrates the connection between the speaker-microphone set, the radio frequency transmitter and the positioning and modem system of the self-powered positioning and modem system for the radio/audio communication device according to the preferred embodiment of the present invention.

FIG. 8 illustrates the connection between the speaker-microphone set 10, the radio frequency transmitter 20, the positioning and modem system 30 and a user. As shown in the FIG. 8, the speaker-microphone set 10 can be a conventional PPT wireless radio/audio communication device 10 or a hands-free receiving and transmitting device 10', wherein the hands-free receiving and transmitting device has another alternative mode 10". The hands-free receiving and transmitting device 10" of the speaker 12" is separated from the microphone 11", such that the speaker 12" is attached to an ear of the user and the microphone 11" is attached to the throat area of the user.

The self-powered positioning and modem system for a radio/audio communication device is being worn on the user in such a manner that the speaker-microphone set 10 is situated in the head area of the user while the radio frequency transmitter 20 and the positioning and modem system 30 are placed on the lower-torso area of the user.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A self-powered positioning and modem system for an existing two-way radio which comprises a speaker-microphone set having an Push-to-Talk (PTT) activation circuit controlling an audio signal to be wirelessly sent and received by a radio frequency transmitter between a transmit mode and a receive mode, wherein said self-powered positioning and modem system comprises:

a GPS controller for externally and directly connecting to speaker-microphone set in such a manner that said GPS controller is triggered to wirelessly transmit said positioning signal when said activation circuit of said speaker-microphone set is activated, wherein said GPS controller comprises:

a position information receptor arranged to receive positioning signal, wherein said GPS controller is triggered for wirelessly transmitting said positioning signal through said radio frequency transmitter;

a signal converter linked to said position information receptor to encode said positioning signal into a RF positioning signal, such that said positioning signal is encoded and transmitted as said RF positioning signal in a wireless manner through said radio frequency transmitter; and a baseband signal processor arranged to mix said positioning signal with a RF audio signal of said speaker-microphone set for wirelessly transmitting said positioning signal through said radio frequency transmitter, wherein said self-powered positioning and modem system is adapted to transmit said positioning information by receiving said positioning signal through said GPS controller, and then wirelessly transmitting said positioning signal through said radio frequency transmitter when said activation circuit of said speaker-microphone set is activated, in such a manner that said positioning signal is mixed with said audio signal for wirelessly transmitting said positioning signal through said radio frequency transmitter, and that said positioning signal is encoded into a corresponding RF positioning signal, wherein said GPS controller is periodically self-triggered to wirelessly transmit said positioning signal without said audio signal.

2. The system, as recited in claim 1, further comprising a portable case receiving said GPS controller therein, wherein said portable case is adapted for externally connecting between said speaker-microphone set and said radio frequency transmitter to communicatively link said GPS controller between said speaker-microphone set and said radio frequency transmitter.

* * * * *